July 11, 1961 G. S. LEE 2,991,819
TIRE REPAIR DEVICE AND METHOD
Filed Nov. 21, 1957
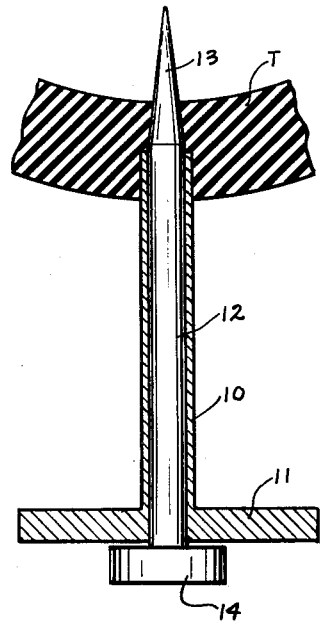
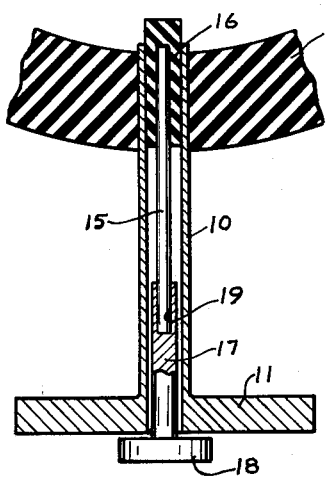
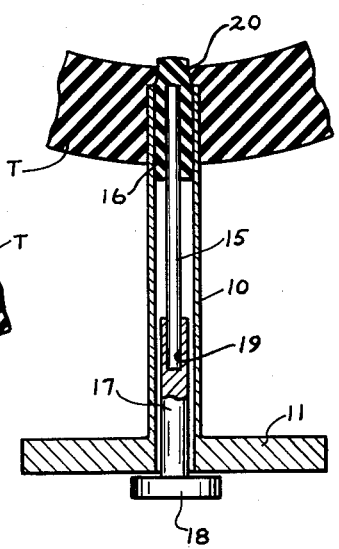
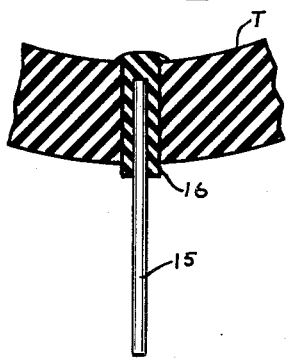
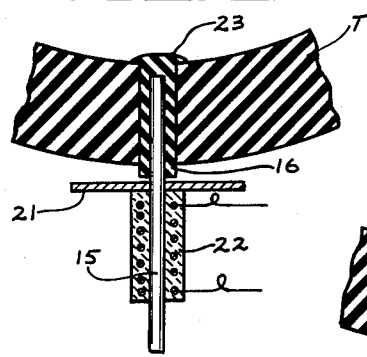
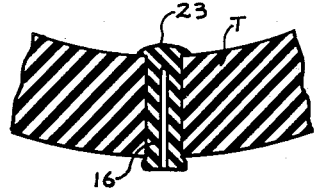
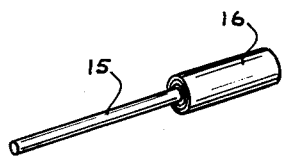
INVENTOR.
GEORGE S. LEE
BY Carlsen & Hagle
ATTORNEYS

United States Patent Office 2,991,819
Patented July 11, 1961

2,991,819
TIRE REPAIR DEVICE AND METHOD
George S. Lee, 715 7th Ave. N., Fargo, N. Dak., assignor of one-half to Raphael H. Bruns, Fargo, N. Dak.
Filed Nov. 21, 1957, Ser. No. 697,860
1 Claim. (Cl. 152—370)

This invention relates generally to the repairing of puncture openings in tires.

The object of the invention is to provide a new and improved device and method for repairing the puncture opening in a tubeless tire casing whereby a plug of uncured rubber may be inserted into the opening and then vulcanized to the walls of the opening to provide an airtight seal enabling further use of the casing.

With this and still other objects in view, my invention broadly comprises the method of repairing a tire puncture opening by forcing a tubular insertion tube into the opening, then inserting a body of uncured rubber through the tube into the area of the opening, then removing the tube from the tire, then curing the rubber body by heat to vulcanize it in sealing position in the opening. The invention further comprises a device for carrying out the method described.

The above mentioned and still additional objects of the invention will be brought to light during the course of the following specification, reference being made to the accompanying drawing, in which—

FIG. 1 is a fragmentary section through a tire casing showing a punctured portion thereof with the insertion tube and dilating member partially driven into the opening.

FIG. 2 shows the insertion tube in its inner position having been forced completely through the casing and with the patching plug having been inserted through the tube.

FIG. 3 is similar to FIG. 2 but with the insertion tube partially withdrawn from the casing.

FIG. 4 shows the position of the vulcanizing plug and its heat transfer rod after the insertion tube has been withdrawn.

FIG. 5 is similar to FIG. 4 but with a heating means applied to the heat transfer rod.

FIG. 6 shows the vulcanizing plug after vulcanization to the casing and after removal of the heat transfer rod.

FIG. 7 is a perspective view of the heat transfer rod and vulcanizing plug prior to use.

Referring now more particularly to the drawing reference characters will be used to denote like parts or structural features in the different views. In FIGS. 1 through 6 there is shown a small section of a tire casing T which has been punctured as by a nail, screw or similar object. A puncture opening dilating means comprises an insertion tube 10 having cross handle 11 at one end and a dilating rod 12 which has a close sliding fit within the tube 10. Tube 10 has a greater diameter than the unenlarged puncture opening. Rod 12 is sharply pointed as at 13 at one end and has a pounding head 14 at its other end. Rod 12 is somewhat longer than the tube 10 so that when the head 14 rests against the handle 11 the pointed portion 13 will project beyond the tube.

The first step in repairing the puncture opening is to insert the dilating means 10, 12 into the opening. This may be accomplished by pounding on the head 14 of the rod 12 with the rod forcing the tube 10 completely through the opening. FIG. 1 shows the tube 10 about half way through the thickness of the casing. In FIG. 2 the tube is shown fully penetrating the casing and when the tube is pounded to this position with the inner end extending to or just beyond the inner surface of the casing, the tube is in the proper position for the next step. The dilating rod 12 is then removed and tube 10 provides an open passage through the casing.

The next step involves insertion of the plug unit. A heating rod 15 has the plug 16 of uncured rubber formed around one end. This may best be observed in FIG. 7. The heating rod 15 serves as a plug core and is a straight length of heat conductive metal while the plug 16 may be formed of a sheet of plasticized thermosetting rubber compound which is wrapped tightly around one end portion of the rod so as to also cover the rod end. The device shown in FIG. 7 may be referred to generally as the plug unit.

A plug unit holder 17 is provided for inserting the unit into the tube 10. This holder has a head 18 at one end and a socket 19 at the opposite end adapted to receive and seat the exposed end of the heating rod 15. Thus after the dilating rod 12 has been withdrawn from the tube 10, the heating rod 15 is seated in the holder 17 and the combined assembly is inserted into the tube so that plug 16 is moved to the position shown in FIG. 2 or into the area of the puncture opening and somewhat beyond the end of tube 10.

The next step is to withdraw the insertion tube 10 from the tire casing. This is accomplished by exerting outward force upon the handle 11. FIG. 3 shows the tube in partially withdrawn position. As the tube is withdrawn the initial movement will pull the plug 16 with the tube, there being a frictional association between the plug and tube. However, as the end of the tube begins to pass through the casing the puncture opening is left undistended and the casing surrounding the opening will close around the tip end portion 20 of the plug 16, as shown in FIG. 3. As the plug is peripherally gripped by the casing it will be held in position as the insertion tube 10 and holder 17 are completely withdrawn. This leaves the plug and rod 15 in the casing as shown in FIG. 4.

The next step is to vulcanize the plug. This is accomplished by sliding an insulating washer or shield 21 onto the heating rod 15 and then applying a heating element 22 to the extended portion of the rod. Element 22 fits around the rod and may be formed of a slow burning material or may be electrically heated such as the unit shown in FIG. 5.

The element 22 is heated to heat the rod 15 which in turn conducts the heat to the plug 16. The contact of rod 15 with the uncured rubber of plug 16 vulcanizes the latter which causes the plug to adhere to the casing, a firm bond being set up between the peripheral surface of the plug and the cylindrical casing surface surrounding the puncture opening. The closed end portion of plug 16 will when heated tend to flatten as at 23 against the casing interior. The vulcanization process will also cause the plug to free itself from the rod 15 allowing the rod to be withdrawn.

FIG. 6 of the drawings shows the plug in its final sealing position within the puncture opening. The plug is strongly bonded to the casing by the vulcanization process without the use of adhesives. The insertion device used does not require the use of lubricants which would interfere with the bonding of the plug.

I have thus provided a tire repair device and method which economically and effectively carries out the aforementioned objects. It is understood that suitable modifications may be made in the structure as disclosed, provided such modifications come within the spirit and scope of the appended claim.

Having now therefore fully illustrated and described my invention, what I claim to be new and desire to protect by Letters Patent is:

A plug unit for repairing the puncture opening in a tubeless tire and adapted for use with an insertion tube for inserting the unit into the opening, said unit comprising a straight elongated solid wirelike rod of heat conductive metal having a constant cross sectional dimension throughout its length, said rod having one end portion completely covered with a layer of uncured rubber compound forming an elongated cylindrical plug unit having a substantially constant diameter throughout its length allowing the plug to pass completely through such insertion tube, the end portion of the rod opposite said covered portion being uncovered for direct contact with a heat producing means, and said uncovered portion of the rod being at least as long as the covered portion thereof.

References Cited in the file of this patent

UNITED STATES PATENTS

| | | |
|---|---|---|
| 567,402 | Moomy | Sept. 8, 1896 |
| 639,986 | Isbills | Dec. 26, 1899 |
| 725,171 | Sutton | Apr. 14, 1903 |
| 734,108 | Tingley | July 21, 1903 |
| 1,216,654 | Burke | Feb. 20, 1917 |
| 1,348,005 | Hirst | July 27, 1920 |
| 1,545,033 | Burdette | July 7, 1925 |
| 1,917,261 | Hawkinson | July 11, 1933 |
| 2,095,931 | Kraft | Oct. 12, 1937 |
| 2,243,506 | Mitchell | May 27, 1941 |
| 2,638,961 | Everett | May 19, 1953 |
| 2,727,554 | Westfall | Dec. 20, 1955 |

FOREIGN PATENTS

| | | |
|---|---|---|
| 770,568 | Great Britain | Mar. 20, 1957 |